US008717172B2

(12) United States Patent
Parker et al.

(10) Patent No.: US 8,717,172 B2
(45) Date of Patent: May 6, 2014

(54) ALERT FOR REAL-TIME RISK OF THEFT OR LOSS

(75) Inventors: Timothy Parker, Richmond (CA); Damien Gerard Loveland, Richmond (CA)

(73) Assignee: Absolute Software Corporation, Vancouver, CA (US)

( * ) Notice: Subject to any disclaimer, the term of this patent is extended or adjusted under 35 U.S.C. 154(b) by 424 days.

(21) Appl. No.: 12/878,927

(22) Filed: Sep. 9, 2010

(65) Prior Publication Data
US 2011/0057797 A1 Mar. 10, 2011

Related U.S. Application Data

(60) Provisional application No. 61/240,993, filed on Sep. 9, 2009.

(51) Int. Cl.
*G08B 13/14* (2006.01)

(52) U.S. Cl.
USPC ............... 340/568.1; 340/438; 340/539.13; 340/572.1; 455/411; 702/187; 709/224; 723/21; 723/35

(58) Field of Classification Search
USPC ............... 340/568.1–572.9, 539.13, 539.15, 340/539.23
See application file for complete search history.

(56) References Cited

U.S. PATENT DOCUMENTS

| | | | |
|---|---|---|---|
| 5,497,149 A | 3/1996 | Fast | |
| 5,517,429 A | 5/1996 | Harrison | |
| 5,715,174 A | 2/1998 | Cotichini et al. | |
| 5,748,084 A | 5/1998 | Isikoff | |
| 5,764,892 A | 6/1998 | Cain et al. | |
| 5,802,280 A | 9/1998 | Cotichini et al. | |
| 5,825,283 A * | 10/1998 | Camhi | ............... 340/438 |
| 5,963,131 A | 10/1999 | D'Angelo et al. | |
| 6,028,514 A | 2/2000 | Lemelson et al. | |
| 6,244,758 B1 * | 6/2001 | Solymar et al. | ............... 709/224 |
| 6,269,392 B1 | 7/2001 | Cotichini et al. | |
| 6,300,863 B1 | 10/2001 | Cotichini et al. | |
| 6,362,736 B1 | 3/2002 | Gehlot | |
| 6,507,914 B1 * | 1/2003 | Cain et al. | ............... 726/35 |
| 6,509,867 B1 | 1/2003 | McGibney | |
| 6,608,559 B1 | 8/2003 | Lemelson et al. | |
| 6,614,349 B1 | 9/2003 | Proctor et al. | |

(Continued)

FOREIGN PATENT DOCUMENTS

| | | |
|---|---|---|
| AU | 2010292939 | 9/2009 |
| JP | 2007072622 | 3/2007 |
| JP | 2009049568 | 5/2009 |

OTHER PUBLICATIONS

International Search Report mailed on Jan. 4, 2011, in counterpart PCT application No. PCT/CA2010/001417.

(Continued)

*Primary Examiner* — Daniel Wu
*Assistant Examiner* — Israel Daramola
(74) *Attorney, Agent, or Firm* — Knobbe, Martens, Olson & Bear, LLP

(57) ABSTRACT

Devices, methods, systems and a computer readable medium for the provision of alerts to electronic devices in response to real-time, location based analysis of the risk of theft or loss of such devices are provided. A continually updated database of locations of thefts, losses and/or stolen or lost electronic devices is accessed in order to provide the alerts to the electronic devices.

25 Claims, 4 Drawing Sheets

(56) References Cited

U.S. PATENT DOCUMENTS

| | | | |
|---|---|---|---|
| 6,940,407 B2* | 9/2005 | Miranda-Knapp et al. | 340/572.1 |
| 7,848,905 B2* | 12/2010 | Troxler et al. | 702/187 |
| 8,385,883 B2* | 2/2013 | Rajan et al. | 455/411 |
| 2005/0149752 A1 | 7/2005 | Johnson et al. | |
| 2005/0216757 A1 | 9/2005 | Gardner | |
| 2006/0244588 A1* | 11/2006 | Hannah et al. | 340/539.13 |
| 2006/0272020 A1 | 11/2006 | Gardner | |
| 2006/0290506 A1 | 12/2006 | Badenhop et al. | |
| 2007/0273499 A1 | 11/2007 | Chlubek et al. | |
| 2008/0030331 A1 | 2/2008 | Chen et al. | |
| 2008/0094230 A1 | 4/2008 | Mock et al. | |
| 2008/0186162 A1* | 8/2008 | Rajan et al. | 340/539.13 |
| 2008/0211670 A1 | 9/2008 | Gordon | |
| 2008/0250510 A1 | 10/2008 | Stevens | |
| 2008/0254811 A1 | 10/2008 | Stewart | |
| 2009/0249485 A1 | 10/2009 | Rivera et al. | |
| 2009/0293120 A1* | 11/2009 | Feng et al. | 726/21 |
| 2010/0076794 A1 | 3/2010 | Seippel | |
| 2010/0115092 A1 | 5/2010 | Westin | |

OTHER PUBLICATIONS

Smith, Doug, "Mobile Application that Protects your Children from Sex Offenders," Mobility Digest, dated, Apr. 14, 2009, Retrieved from http://mobilitydigest.com/mobile-application-that-protects-your-children-from-sex-offenders, printed on Apr. 10, 2013 (5 printed pages).

Supplementary European Search Report mailed on Apr. 18, 2013, in counterpart European Appl. No. 10814852.9, corresponding to PCT application No. PCT/CA2010/001417.

Patent Examination Report No. 1 issued on Mar. 21, 2013, in counterpart Australian Appl. 2010292930.

International Preliminary Report on Patentability for PCT/CA2010/001417 dated Jan. 18, 2012.

* cited by examiner

ALERT FOR REAL-TIME RISK OF THEFT OR LOSS

CROSS-REFERENCE TO RELATED APPLICATION

This application claims the benefit of U.S. Provisional Patent Application No. 61/240,993, filed on Sep. 9, 2009, priority from the filing date of which is claimed, and which is hereby fully incorporated by reference.

TECHNICAL FIELD

The present disclosure relates to the protection of electronic devices from loss or theft, and in particular to systems and methods for alerting an owner or legitimate user of an electronic device of the risk of loss or theft thereof.

BACKGROUND

People are often forgetful or distracted in busy or transient spaces, such as airports, taxis, trains, hotels, shopping malls, etc. and thieves often take advantage of this to steal personal electronic computing or communications devices. Apart from being stolen, such devices are often lost in these busy areas. Since proprietary information is routinely stored on such devices, the need to protect such proprietary or sensitive data and to prevent the theft of such devices is self-evident.

Laptops, and increasingly other electronic devices such as cell phones, PDAs, smart phones (e.g. Blackberry™, iPhone™), memory sticks, personal media devices (e.g. iPod™), gaming devices and personal computers, are often remotely tracked so that they can be recovered in the event of theft. Such tracking may be effected by sending location information to a remote storage site or an email server.

While such tracking systems may be effective in the recovery of lost or stolen electronic devices, they do little to help prevent loss or theft in the first place. Accordingly, in an effort to discourage theft, owners of tracked or untracked personal electronic computing and communications devices sometimes apply irremovable and/or indelible warning stickers to such devices. However, perhaps in part because a thief may not see a warning sticker before or during the commission of a theft (and is not likely to return the stolen device to the owner if the thief sees the warning sticker afterwards), these sorts of warning stickers have shown in practice to provide only a limited amount of protection against theft.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below. Neither this summary nor the following detailed description purports to define or limit the invention; the invention is defined only by the claims.

The subject matter described herein provides a system and method for the automatic provision of alerts to owners and/or legitimate users of electronic devices that are at potential risk of loss or theft. A frequently-updated database of locations of theft incidents, locations of losses and/or current or recent locations of lost or stolen electronic devices is used to provide alerts to the owner or legitimate user when his/her electronic device is detected to be in an elevated risk zone for loss or theft. The level of risk of the zone is ideally detected in real or near-real time.

In embodiments of the disclosed subject matter, an agent in a protected electronic device communicates its location, or location specific information, at selected intervals to a monitoring center, which maintains a database of the location information of previously lost or stolen devices. If the location of the protected electronic device is determined to be within a zone of recent loss or theft activity (i.e. an elevated risk zone for loss or theft), the owner or user of the protected electronic device is alerted.

In some embodiments, alerts can additionally be transmitted from one protected device to other protected devices in the same vicinity in order to provide an enhanced awareness of the risk of theft. In other embodiments, alerts may additionally or alternatively be transmitted to non-protected devices (such as, for example, cell phones or the like carried by the owner or legitimate user of the protected device, or devices of the sort typically used or monitored by security organizations or personnel).

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

A. Terminology

Figure 1:
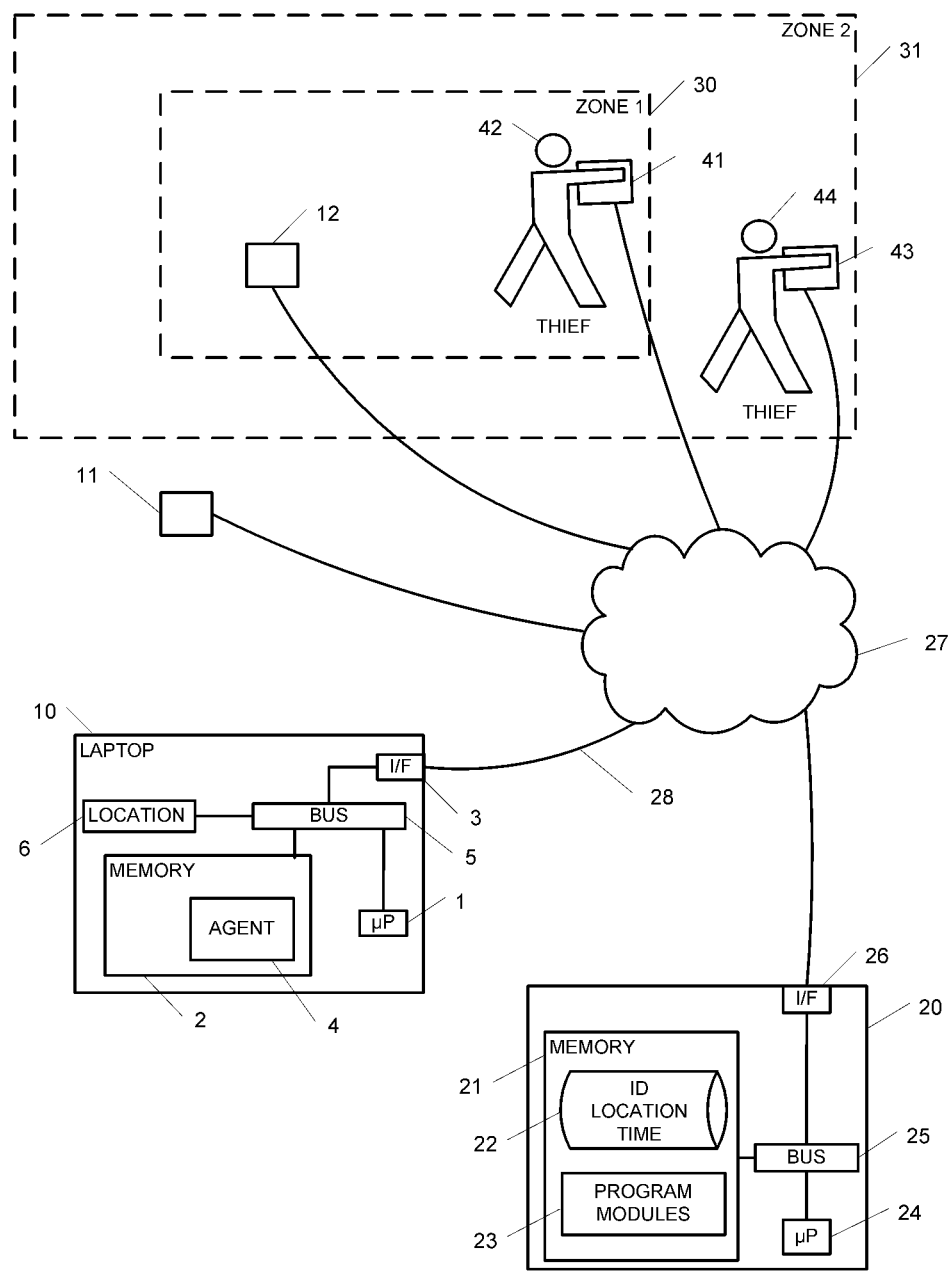
FIG. 1 is a schematic functional block diagram of a system and method for the automatic provision of alerts to owners of electronic devices in accordance with an embodiment of the disclosed subject matter.

Agent—as used herein, is a software, hardware or firmware agent that is ideally persistent and stealthy, and that resides in a computer or other electronic device. The agent provides servicing functions which require communication with a remote server. The agent is tamper resistant and can be enabled for supporting and/or providing various services such as data delete, firewall protection, data encryption, location tracking, message notification, and software deployment and updates. An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of an agent are disclosed in U.S. Patent Application Publication Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality could be used. For the purposes of the present disclosure, the minimum functional attribute of the agent is to facilitate communications between the electronic device and a monitoring center or other remote computer or server. Communications may be initiated by the agent, by the monitoring center, or by both.

Host—This is the electronic device to be protected. Examples of a host include a laptop, cell phone, PDA, smart phone (e.g. Blackberry™, iPhone™), memory stick, personal media device (e.g. iPod™), gaming device, personal computer, and netbook. The agent resides in the host.

Monitoring Center—This is a guardian server or other computer or server that the agent communicates with or sends a message to. It may be an email server or it may be a distribution of servers or other computers. For example, provided an internet connection is available to the host, an agent may call the monitoring center once a day (or at some other selected suitable interval) to report the location of the host, download software upgrades if there are any and repair any security modules that are or should be installed on the host. The interval between calls may be modified (e.g. reduced) if a host moves into a high risk area from a low risk area. In the embodiments disclosed herein, the agent sends host identification and location information to remote electronic storage located in the monitoring center, and/or any other data desired to be transferred. Communication to the monitoring center may be, for example, via the internet (wired or wireless), via a wired or wireless telephone network, via cable or via satellite. The functions of a monitoring centre may be incorporated or associated with an electronic social network server.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. In general, unless otherwise indicated, singular elements may be in the plural and vice versa with no loss of generality. The use of the masculine can refer to masculine, feminine or both. Drawings are not to scale.

B. Exemplary Embodiment

A schematic functional block diagram of a preferred embodiment is shown in FIG. 1. In many parts of the following detailed description, the subject matter has been explained in relation to stolen devices, but as would of course be evident to those of skill in the art, it applies equally as well to devices that are lost or are at risk of being lost.

A host electronic device 10 such as a laptop comprises an agent 4 which can communicate regularly, non-periodically, randomly, semi-randomly or according to triggers, to monitoring center 20 via the interne 27, via some other telecommunications network, or via a combination of these. Short Message Service (SMS) messaging can be used for all or some of the communications, for example.

The agent 4 is located in electronic memory 2 in the host device 10. The memory 2 may be divided into different components and/or different types of memory, and the agent 4 may be resident in more than one portion of memory 2. In the device 10, there is also a location device 6, such as a GPS, or an A-GPS device, or some other device performing location determination. The locating device 6 may be a component or module separate from the memory 2 as shown in FIG. 1, or it may be a module contained in or partially contained in the memory 2 of the electronic device 10. There may be one, two or more locating devices 6, each operating on a different principle or one acting as a backup for another. The electronic device 10 generally contains a processor 1 for processing computer readable instructions, such as those forming the agent 4, and reading/writing data to and from the memory 2 via a bus 5. The electronic device 10 also includes an interface 3 to the internet 27 or other communication network. It should be appreciated that a device 10 that connects to the internet 27 may in some cases be considered part of the internet 27. The link 28 to the internet 27 or telecommunications network may be wired or wireless, or both.

The agent 4 sends data, which identifies the host and may include location information, to a monitoring center 20 to be stored in remote storage device(s) 21. Location and/or host identification data may optionally be encrypted for privacy reasons. The monitoring center 20 may be a server which contains an interface 26 to the network 27, a bus 25 via which components internal to the server communicate and a processor 24 for processing computer readable instructions in the memory 21. Examples of instructions may be those included in one or more program modules 23 for storing and/or encrypting incoming identification and location data from multiple host devices 10, and for retrieving host identification data, host location data and theft records from one or more databases 22. In some embodiments, the server may be formed from multiple distinct computers or computing devices that communicate over a network.

In the case of theft or loss of a protected electronic device 41, the user or owner of the device 41 reports it to the monitoring center 20. The monitoring center 20 records location information for the stolen device 41 in, for example, a database 22. Such a database can store the identification of a device, its location and the time it was at that location, and optionally encrypt some or all of this information. The server 20 also has information relating to the location of other devices 11, 12 which are being monitored for security reasons. By selecting from the database 22 the details of any other device(s) 12 that are in the same general area or zone 30 as the stolen device 41, the owner and/or user of such a device(s) 12 can be alerted to the presence in the zone 30 of a lost or stolen device 41, and the possibility that there is a thief 42 operating in the zone 30. In this example, devices 10, 11 would not be sent an alert because they are outside the zone 30 in which there is a lost/stolen device 41.

The thief 42 may have just stolen the device 41, or may have brought the device 41 into the area, or the device 41 may be being used or in the possession of an unwitting purchaser, who, not knowing the device was stolen, bought it from a thief.

As stolen device(s) 41 can be configured to report their location frequently (e.g. every minute, 5 minutes, ¼ hour), the database 22 which contains the location details of lost and/or stolen devices 41 is continually up-to date, or as up-to-date as possible taking into account that the devices 41 must have power and a communication link to the monitoring center 20. As a result, alerts relating to real-time or near-real-time information may be given to the users of device(s) 12 to indicate to them that they are in an area of elevated risk of theft.

The size of the area that is taken into account for risk assessment can be varied. It can be varied automatically, or it can be dependent on the precision at which location coordinates can be detected. A user could set the size of the risk zone to be taken into account. For example, the size of the zone to be evaluated could correspond to a single building, such as "ZONE 1" 30, or it could correspond to a site with several buildings "ZONE 2" 31, which in the example shown includes an additional thief 44 with a second stolen device 43.

The size of the zone may be defined as an area within a certain distance of the device to be alerted. For example, the distance could be 10 m, 100 m, 500 m, 2 km, or other distance.

An alert sent to a device 12 may be an audio alert, such as a chime, a voice message or a notification of an SMS message. For example, a text message sent as an alert could be: "BEWARE: 1 lost/stolen laptop in this vicinity" or "BEWARE: 24 devices lost/stolen here in the last 3 days". In the example shown, the alert given to device 12, where the zone of interest is "ZONE 2" 31 could be: "BEWARE: 2 lost/stolen laptops in this vicinity". The device can be configured to chime regularly, say every 10 seconds, as a constant reminder to the user of the device 12 that the device is still within a zone 30, 31 of recent theft activity.

In some embodiments, the alert may additionally or alternatively be sent to a separate electronic device that does not include an agent 4. By way of example with reference to FIG. 1, if protected electronic device 12 is located within zone 30, the owner or legitimate user of protected electronic device 12 may be alerted by text message sent to his/her non-protected cell phone. In further embodiments, the alert may additionally or alternatively be sent via text message or otherwise to the mobile phones of security personnel who are presently in the zone 30, whether or not their mobile phones include an agent 4. Security personnel or organizations may also in some embodiments register with the monitoring center 20 to automatically receive alerts that pertain to particular geographic regions.

Shared Alerts

Figure 2:
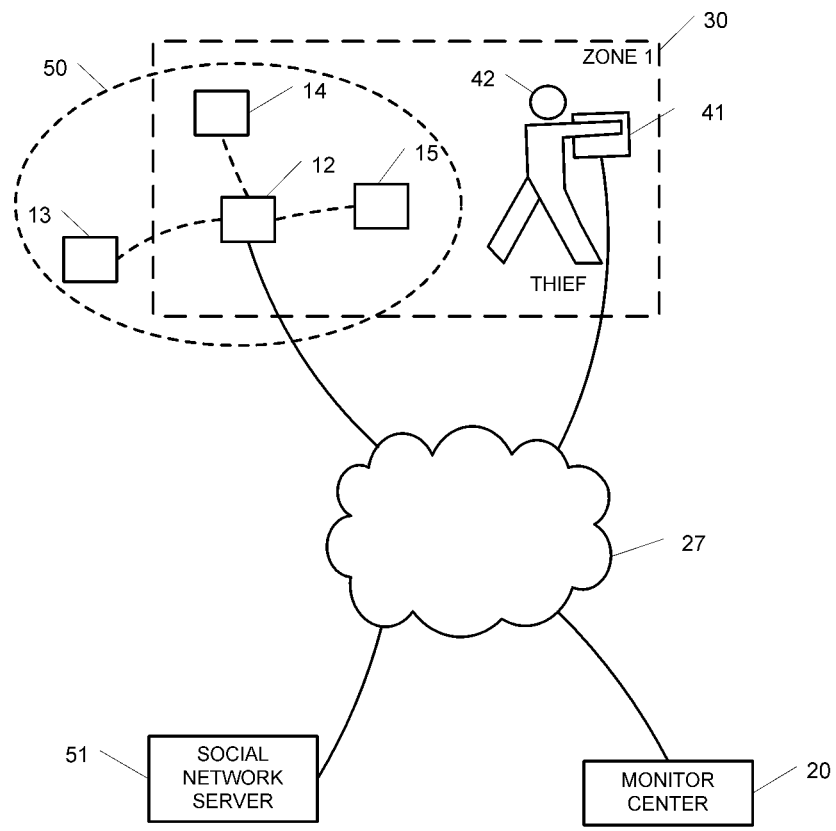
FIG. 2 is a schematic functional block diagram of a system and method for the automatic provision of shared alerts to owners of electronic devices in accordance with alternate embodiments of the disclosed subject matter.

In an extension to the exemplary embodiment described above, a protected device 12 shown in FIG. 2 may be configured to share any alerts it receives with neighboring devices 13, 14, 15. The alert received could be a result of a thief 42 having in his possession a stolen device 41 which has called into the monitoring center 20 with details of its location. The neighboring devices 13, 14, 15 may be connectable to the protected device 12 via Bluetooth communication links. They may belong to the same person who uses device 12, or different people. A group 50 of different people may be connected because they, for example, belong to the same electronic social network managed by a server 51 or they are tethering to gain access to the internet 27. It may happen that some device(s) 13 linked together in this way may be outside the risk zone 30, but still receive an alert. As it is not essential to define the boundaries of the zone 30 precisely, and since the range of Bluetooth is not intended to be high, this is of no real consequence.

Proximal Devices

Figure 3:
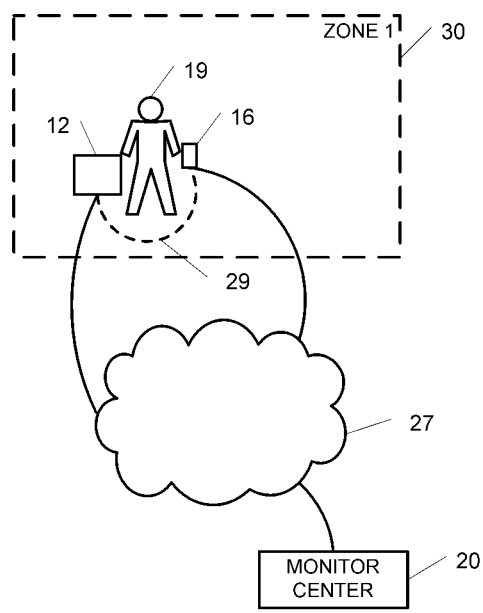
FIG. 3 is a schematic functional block diagram of a system and method for the automatic provision of alerts to owners of proximal electronic devices in accordance with alternate embodiments of the disclosed subject matter.

FIG. 3 shows a situation where two devices 12, 16 are in the possession of the same person 19. Both devices are configured to communicate their location data to the monitoring centre 20 via a network 27. When a monitoring center 20 detects that one or both of the devices 12, 16 are in a high theft risk zone 30, and provided the location determination mechanism is sensitive enough, say to a resolution of 1 m or 2 m, or in some cases maybe more, then the system can detect the approximate separation of the two devices 12, 16. The separation can be calculated from time to time in a module 23 in the monitoring center 20, as and when the devices 12, 16 send in their location data. If the separation exceeds a certain threshold, say 2 m, then one or both of the devices 12, 16 can be instructed to sound an alarm. This would serve to remind the user to check that one of the devices 12, 16 has not been inadvertently left behind somewhere.

In another variant of this embodiment, each device 12, 16 could be equipped with an accelerometer for detecting its motion. An example of such an accelerometer is a three-axis accelerometer commonly found in smart phones. By comparing motion data from the two devices, an approximate separation between the two can be monitored by an application running on one or both of the devices, the necessary communication between the devices being via Bluetooth 29 or via another network 27. The application could run when the user is travelling, or could run only when the user is in an elevated risk zone 30 in order to conserve battery energy. If the separation exceeds a predefined distance, then an alarm could sound on one or both of the devices 12, 16.

Figure 4:
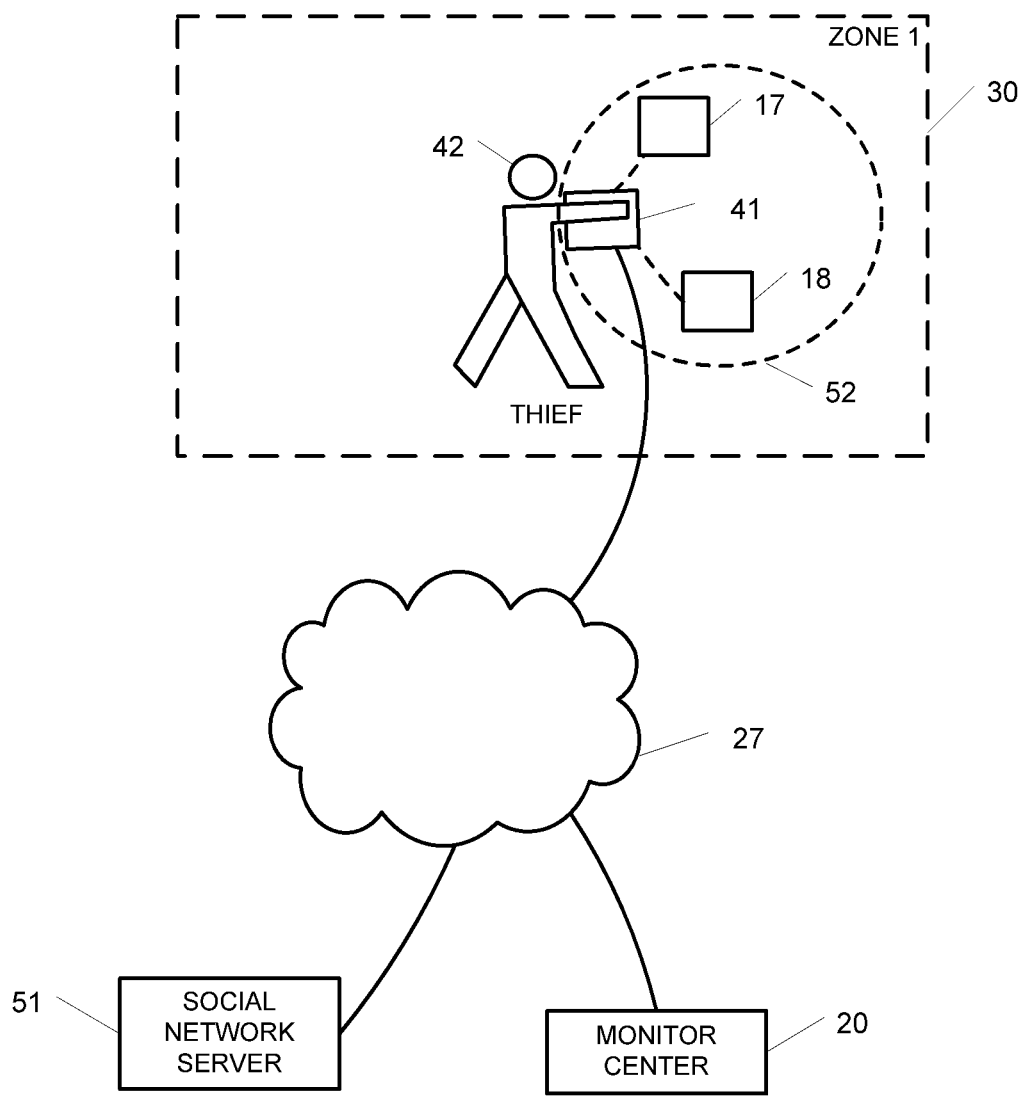
FIG. 4 is a schematic functional block diagram of a system and method for the automatic provision of shared alerts to owners of electronic devices in accordance with alternate embodiments of the disclosed subject matter.

FIG. 4 shows a device 41 that has been stolen by a thief 42 in a zone 30. The stolen device 41 communicates via Bluetooth to a group of other devices 17, 18 that are in the range 52 of the Bluetooth signal. The device 41 is aware that it has been stolen, either by auto-detection, or by being informed by the monitoring center 20 after being reported stolen by its owner, and transmits an alert and/or a 'help' signal to the other devices 17, 18, where the signal contains descriptive information about the device 41. The descriptive information may be retrieved from the monitoring centre 20, or from a social network server 51 via network 27, and may include information uploaded there by the owner of the stolen device 41 prior to travelling. Such descriptive information might, for example, be used to create an alert that reads: "I'm lost! I'm a laptop in a blue shoulder bag with a red maple leaf". Devices 17, 18 that receive this alert may be used by security personnel, for example in an airport, or they may belong to owners in the same social network group as the owner of the lost/stolen device 41. Agent 4 does not have to be installed on the devices 17, 18 in order for them to be capable of receiving the Bluetooth 'help' signal alert.

Figures 5, 6:
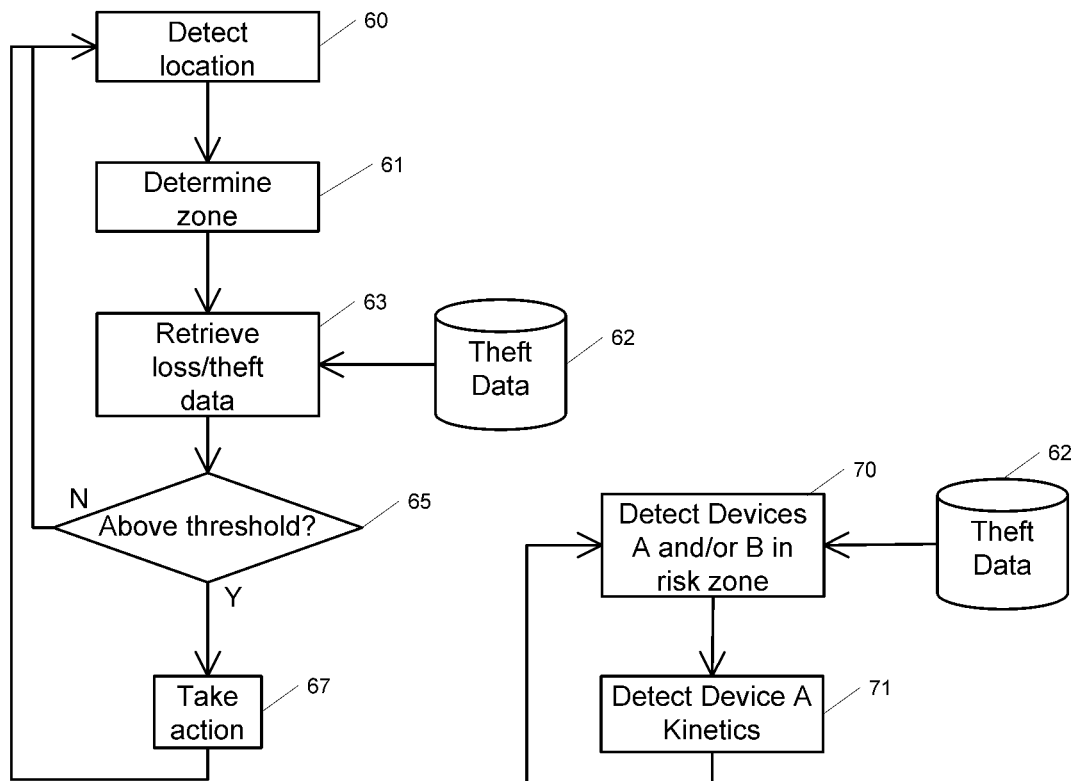
FIG. 5 is a functional flow diagram schematically representing the alert provision process of the system and method of FIG. 1.
FIG. 6 is a functional flow diagram schematically representing the alert provision process of the system and method of FIG. 3.

FIG. 5 is a functional flow diagram schematically illustrating steps in the process that the system of FIG. 1 carries out. In step 60, the monitoring center of the system detects the location of a protected electronic device upon receiving location data from the agent located in the device. A zone around the location of the protected device is then selected or determined in step 61. The monitoring center of the system then retrieves 63 loss and/or theft data 62 for that zone. The theft data 62 is retrieved 63 from a theft database 22 (FIG. 1). If 65 the theft data 62 selected for the location in question is above a selected threshold (e.g. above zero items lost/stolen, above 1, above 2, etc.) for a selected period of time (e.g. last 24 hours, last week, last 25 days, last 2 months, last year, year to date, per week, per month, all time as covered by the database, all time to the extent that all records including third party records can be accessed), then the monitoring center sends an alert message to the device instructing the device to take action or set of actions 67, which could, for example, be the repeated sounding of an alert chime. The alert message is processed by the agent and the agent responds by performing or initiating the specified action(s) 67, and the monitoring center may select the action content based on associated theft data stored in the database 22. For example, action(s) 67 may include the display of a text message that indicates the number of recent thefts, when such thefts were reported, the types of devices stolen, the size or approximate boundaries of the zone, etc. In some embodiments, the monitoring centre may also refrain from sending any alert messages to a device that has been reported as stolen.

The threshold, the selected period of time, and/or the zone size may in some embodiments be selected programmatically based on the number of protected devices in a given area, or on other selected factors. By way of example, in an area that includes a high density of monitored protected devices, such as in a large office, a higher threshold and/or a smaller zone size may be implemented.

If 65 the theft data 62 is not above a certain threshold, no alert message is sent and no action 67 is taken. Whether action 67 is taken or not, the process next reverts to detecting 60 the location of the protected electronic device, so that the location is monitored in real time or near real time, and real time or near real time theft data 62 is also retrieved, so that current alerts, if any, can be given.

FIG. 6 is a functional flow diagram schematically illustrating steps in the process the system of FIG. 3 performs. In step 70, the monitoring center of the system carries out steps 60 through 65 (FIG. 5) in relation to at least one proximal protected device A or B (12, 16 in FIG. 3) to detect that one of the two devices A and B are in a theft risk zone, using theft data 62 that has previously been established in relation to the location of the devices. The system then detects 71 the kinetics (i.e. state of motion and/or state of rest) of device A, and also detects 72 the kinetics of device B. The system calculates 73 changes in the relative spatial separation between the two devices A and B. If 74 the separation increase beyond a selected threshold, an alert message is sent from the monitoring center to one or both proximal protected devices A and B to cause the sounding 75 thereby of an alert chime. If 74 the separation does not exceed the threshold, no alert is sounded. The process then reverts back to detecting 70 whether or not one of the devices is in a high theft risk zone. On first entry into the theft risk zone, a separation can be assumed (e.g. 1 m) or calculated, or the initial separation can be left out of the analysis and only changes in separation can be calculated. FIG. 3 illustrates the situation where two proximal protected devices 12 and 16 are in the possession of the same person, but it will of course be readily understood by those of skill in the art without further illustration how the system and method may be modified to accommodate the situation where three or more proximal protected devices are in the possession of the same person, or where the proximal protected devices are in the possession of a related set of individuals (such as, for example, a family or a set of co-workers).

Alternatives and Variations

If the protected device is, for example, a laptop, the specified action performed or initiated by the agent in response to the receipt of an alert message from the monitoring center may comprise the generation of a pop-up or a series of pop-ups, which will act as a reminder to the laptop owner or user to be a little extra vigilant while in that location. The alert action could also, for example, be one or more of a sound, a series of sounds, a text message, a telephone call, a vibration, a series of vibrations, a light and a series of lights, etc.

The monitoring centre has significant data relating to locations of stolen devices. This can be used to calculate a time-averaged risk profile for each location. Data could be made available to a third party which then provides location based services to its clients. For example, a third party could be an electronic social network or a map provider. Data provided in this way could be averaged over a week, a month, a year, or any other timescale, optionally with the most recent theft or loss events given the most weight. Any data supplied can be stripped of personal or identifiable information. Data trends can be calculated to show whether a location is becoming more or less of a risk, or is remaining stable. Information from such a data source can be fed to review sites, such as restaurant review sites, hotel review sites, airport review sites, school review sites, city review sites, mall review sites, entertainment location review site, etc.; in addition, such trend information could be incorporated into the alert action messages.

Due to management of large numbers of protected devices calling into a monitoring centre, it may be beneficial to have the alert generation managed by a third party. This way, the device need not actually call the monitoring centre directly. It may be location-aware and have access to theft-risk data compiled by the monitoring centre, and made available by the monitoring centre to a third party. As people are likely to be connected frequently to a social network, it may be more efficient to provide the alerts to the users of the devices via social networks. Alternatively, Wi-Fi hot spot providers may register to receive an alert whenever a lost or stolen protected device is determined to be in the vicinity and broadcast this alert to currently connected devices.

Alerts provided to devices may be related to the number of thefts that generally occur in the area, as reported by the owners or users of the devices. Alerts may be related to the presence of stolen devices in an area. Alerts may be based on auto-detection of theft. For example, a device may monitor for triggers of likely theft, such as repeated incorrect passwords attempts or unusual movements.

Steps in the flowcharts may be performed in a different order to that illustrated, or they may be combined where shown separately.

The monitoring centre may be a distributed monitoring centre. For example, devices to be protected could detect unique information relating to their location, such as Wi-Fi signal strengths, beacons, photographs etc. This unique information could be sent directly or indirectly to a server which deduces the location in more meaningful terms, such as a grid reference or street address, from the unique information supplied. The more meaningful location information could then be provided to another server which retrieves the theft data for the location in question.

The threshold for providing an alert to the heightened risk of theft may be defined by the spatial density of thefts. For example, two thefts per week in a large zone may be below a selected threshold, whereas one theft per week in a much smaller zone may be above the selected threshold.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

We claim:

1. A computer-implemented method of alerting electronic device users of theft risk, comprising:
   monitoring the locations of a plurality of electronic devices, wherein monitoring said locations comprises receiving identification and location information reported by said electronic devices regarding their current locations;
   monitoring theft statuses of the electronic devices, at least some of said theft statuses being based on theft events reported by users of the electronic devices;
   determining, based on the monitored locations and monitored theft statuses of the electronic devices, that a first electronic device of said plurality of electronic devices is in a high theft risk zone, said determining comprising automatically classifying the zone as currently having a high theft risk based as least partly on a detected presence within the zone of a second electronic device that is reported as stolen; and
   in response to determining that the first electronic device is in the high theft risk zone, causing an alert to be provided to a user of the first electronic device;
   said method performed automatically by a computerized system.

2. The method of claim 1, wherein the first electronic device is a device that is not currently reported as stolen.

3. The method of claim 1, wherein the theft statuses of the electronic devices are based on one or more of theft events reported by users of the electronic devices, loss events reported by users of the electronic devices, and the current location of devices that are reported as lost or stolen.

4. The method of claim 1, wherein the alert comprises a textual alert message, and the method comprises incorporating, into the textual alert message, data regarding one or more reported theft events associated with the zone.

5. The method of claim 4, wherein said data regarding one or more reported theft events includes data regarding a type of electronic device reported as stolen.

6. The method of claim 4, wherein said data regarding one or more reported theft events includes an indication of when a reported theft occurred.

7. The method of claim 1, wherein causing an alert to be provided to the user comprises transmitting an alert message to the first electronic device.

8. The method of claim 1, wherein the presence of the second electronic device within the zone is a recent presence of the second electronic device within the zone.

9. The method of claim 1, wherein causing an alert to be provided to the user consists of or comprises transmitting a text message to an electronic device of said user other than the first electronic device.

10. Physical computer storage which stores executable code that directs a computer system to perform the method of claim 1.

11. A computer system comprising one or more computing devices, said computer system programmed, via instructions represented in computer storage, to perform the method of claim 1.

12. The method of claim 1, wherein the alert is based at least partly on a substantially real time presence, within the zone, of an electronic device that is reported as stolen.

13. The method of claim 1, wherein determining that said first electronic device is in a high theft risk zone comprises:
   programmatically determining a territorial zone surrounding the first electronic device;
   retrieving data regarding one or more reported theft events associated with the zone; and
   determining whether a number of said reported theft events satisfies a selected threshold.

14. The method of claim 13, wherein determining the territorial zone comprises selecting a zone size based at least partly on a number of monitored electronic devices in an associated area.

15. The method of claim 13, wherein the territorial zone is selected to correspond to a building.

16. The method of claim 1, further comprising, following the determination that the first electronic device is located in the high theft risk zone:
   monitoring a distance between the first electronic device and a third electronic device, said first and third electronic devices both associated with said user;
   comparing the distance to a threshold; and
   causing at least one of the first and third electronic devices to emit an alarm in response to determining that the distance exceeds said threshold.

17. The method of claim 1, wherein the high theft risk classification of the zone is based further on reported locations of theft events.

18. A first mobile electronic device comprising a processor and memory, said first mobile electronic device configured to alert a user of a real-time risk of theft by at least:
   transmitting information indicative of a current location of the first mobile electronic device to a server,
   receiving information from the server that identifies the current location as corresponding to an elevated theft risk, said information, received from the server, based at least partly on a detected presence, within a selected distance of the current location, of a second mobile electronic device that is reported as stolen, and in response to receiving said information, outputting an alert to a user of the first mobile electronic device.

19. The mobile electronic device of claim 18, wherein the first device is further configured to notify a nearby mobile electronic device other than said second device of said theft risk.

20. Non-transitory computer storage having stored thereon executable program code that directs a computer system to at least:
   monitor locations of mobile electronic devices, including mobile electronic devices that are reported as stolen;
   define, based at least partly on the monitored locations of the mobile electronic devices that are reported as stolen, a zone in which a theft risk is elevated, wherein the elevated theft risk zone is defined based at least partly on a detected current or recent location of a mobile electronic device that is reported as stolen;
   detect that a mobile electronic device that is not reported as stolen is in said zone in which the theft risk is elevated; and generate an alert in response to detecting that the mobile electronic device is in said zone.

21. The non-transitory computer storage of claim 20, wherein the zone is defined based additionally on data regarding locations of reported theft events.

22. The non-transitory computer storage of claim 20, wherein the program code additionally directs the computing system to send the alert to the mobile electronic device.

23. The non-transitory computer storage of claim 20, wherein the program code additionally causes the alert to be provided to a user of the electronic device.

24. The non-transitory computer storage of claim 20, wherein the zone is defined based at least partly on data regarding how recently one or more reportedly-stolen mobile electronic devices were in an area associated with said current location.

25. The non-transitory computer storage of claim 20, wherein the zone is defined as an area within a selected distance of the mobile electronic device.

\* \* \* \* \*